(12) United States Patent
Miller et al.

(10) Patent No.: US 9,612,340 B1
(45) Date of Patent: Apr. 4, 2017

(54) SYSTEMS, METHODS, DEVICES AND SUBASSEMBLIES FOR CREATING AND DELIVERING CROWD-SOURCED GNSS MODELS

(71) Applicant: Apple Inc., Cupertino, CA (US)

(72) Inventors: Isaac T. Miller, El Granada, CA (US); Brent M. Ledvina, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 510 days.

(21) Appl. No.: 14/189,577

(22) Filed: Feb. 25, 2014

Related U.S. Application Data

(60) Provisional application No. 61/769,117, filed on Feb. 25, 2013, provisional application No. 61/769,118, filed on Feb. 25, 2013.

(51) Int. Cl.
*G01S 19/39* (2010.01)
*G01S 19/07* (2010.01)
*G01S 19/41* (2010.01)

(52) U.S. Cl.
CPC .............. *G01S 19/39* (2013.01); *G01S 19/07* (2013.01); *G01S 19/41* (2013.01)

(58) Field of Classification Search
CPC ................................. G01S 19/07; G01S 19/41
USPC .......................... 342/357.22, 357.26, 357.44
See application file for complete search history.

(56) References Cited

U.S. PATENT DOCUMENTS

| | | | | |
|---|---|---|---|---|
| 5,884,220 A | * | 3/1999 | Farmer | G01S 19/41 342/357.44 |
| 8,624,779 B2 | * | 1/2014 | Ferguson | G01S 19/04 342/357.58 |
| 9,405,010 B2 | * | 8/2016 | Appleford | G01S 19/04 |
| 2009/0102714 A1 | * | 4/2009 | Talbot | G01S 19/22 342/357.31 |
| 2009/0121927 A1 | * | 5/2009 | Moshfeghi | G01S 19/07 342/357.24 |
| 2010/0225536 A1 | * | 9/2010 | Kobori | G01S 19/23 342/357.44 |

(Continued)

*Primary Examiner* — Marcus Windrich
(74) *Attorney, Agent, or Firm* — Fish & Richardson P.C.

(57) ABSTRACT

Systems, methods, devices and subassemblies for creating and delivering crowd-sourced GNSS models include receiving at one or more navigation receivers first signals transmitted by one or more navigation beacons, determining by the navigation receivers first navigation observables based on the received first signals, receiving at an augmentation server information associated with the first navigation observables, determining by the augmentation server augmentation information based on at least the received information associated with the first navigation observables and computational models, transmitting the augmentation information to the navigation receivers, receiving by the navigation receivers the augmentation information, receiving by the navigation receivers second signals transmitted by the one or more navigation beacon, determining by the navigation receivers second navigation observables based on the received second signals and determining by the navigation receivers a respective high-precision position, velocity, and time (PVT) solution based on the received augmentation information and the second navigation observables.

33 Claims, 4 Drawing Sheets

(56) References Cited

U.S. PATENT DOCUMENTS

2011/0068973 A1\* 3/2011 Humphreys .......... G01S 19/215
 342/357.3
2013/0093618 A1\* 4/2013 Oh ......................... G01S 19/41
 342/357.44

\* cited by examiner

| Perturbation | Model Input to Augmentation Server |
|---|---|
| Earth gravity | EGM-2008 Tide Free gravity model |
| Extra-planetary gravity | JPL DE-421 |
| Direct solar pressure | Montenbruck & Gill (Earth & lunar eclipses, umbra & penumbra), Iqbal model C solar irradiance model, Coarse assumptions about solar panels & antenna |
| Indirect solar pressure | Knocke Earth Radiation Pressure model, Iqbal model C solar irradiance model, Coarse assumptions about solar panels & antenna |
| Earth tides | IERS TN-36 |
| Atmospheric drag | NRL-MSISE00 density, NOAA solar / geomagnetic data |
| Relativistic effects | IERS TN-36 |
| Crustal & tectonic motion | DeMets et al. NUVEL-1A tectonic plate model |
| Ionosphere | IRI-2012, tomographic mapping |
| Troposphere | Saastamoinen dry & wet zenith delays, VMF-1 mapping function |

*FIG. 2*

SYSTEMS, METHODS, DEVICES AND SUBASSEMBLIES FOR CREATING AND DELIVERING CROWD-SOURCED GNSS MODELS

CROSS-REFERENCE TO RELATED APPLICATION(S)

The present application claims priority of U.S. provisional applications 61/769,117, filed Feb. 25, 2013, entitled "GNSS Transceivers that Emulate Satellites to Utilize Empty Bandwidth to Share Information" and 61/769,118, filed Feb. 25, 2013, entitled "Crowd-Source GNSS Models." The entirety of both of the foregoing applications are incorporated by reference herein.

BACKGROUND

Field of the Invention

The present invention relates to the determination and generation of models and/or other augmentation information that may be used to support high-precision position, velocity, and/or timing (PVT) solutions based on signals received from overhead assets such as satellites and, in particular, to techniques suitable for providing such PVT solutions without resort to a generally proximate, terrestrial ground station with a fixed and precisely known position and/or networks of fixed ground stations.

Description of the Related Art

Radio signals have been used as an aid to navigation and to obtain position estimates for decades. In much the same way that sailors could navigate near land using two or more light houses, the earliest systems used a directional antenna that determined a bearing to two or more radio transmitters. As long as line of sight could be maintained between the receiver and the two or more radio transmitters, a location of the receiver could be determined by triangulating the known locations of the two or more radio transmitters and the bearings to each of those radio transmitters. And although this approach may generally provide just a horizontal location (latitude and longitude) of the receiver, this may be adequate for localized navigation, such as the landing of aircraft or the navigation of ships around nearby navigational hazards.

Limiting radio navigation systems to local two-dimensional positioning, however, does not address many interesting positioning problems. For example, surveyors often desire to know the height/altitude of a location as well as its latitude and longitude, and pilots of aircraft often desire to know their altitude. To address these desires, more complex and longer distance radio navigation systems are typically utilized. Many of these radio navigation systems rely on the basic principle that radio waves generally propagate through the air at a known speed. By measuring the length of time it takes for a radio wave to propagate between a transmitter and a receiver, a distance between the transmitter and the receiver may be determined. By using the distance between the receiver and several transmitters with known locations, it is possible to determine the position of the transmitter by trilateration. For example, by using three transmitters, it is possible to determine the latitude, longitude, and altitude of the receiver. As additional transmitters are used and detected by the receiver, additional variables may be removed from the solution. For example, by adding time information to the radio signals, a fourth transmitter may be used to solve for the current time at the receiver.

Global Positioning Satellite (GPS) navigation, and more broadly Global Navigation Satellite System (GNSS) navigation, has become the standard for most military and civilian radio navigation applications. There exist in both military and civil sectors hundreds of millions of GPS or navigation receivers that are used daily to provide real-time positioning and navigation. Many of these navigation receivers are associated with sophisticated communication devices such as cellular phones and/or smart phones. The GPS system is based on a constellation of approximately 24 to 32 middle-earth orbit (MEO) satellites that broadcast continuous carrier wave signals. A GPS receiver typically relies on the ability to receive signals from four or more satellites allowing the receiver to determine latitude, longitude, altitude, and time error at the receiver. A typical navigation receiver relying primarily on signals from GPS satellites may generally achieve positional accuracy to within about 10 meters.

Higher precision PVT solutions for a navigation receiver typically require an augmentation to the general GNSS infrastructure. Traditional augmentation approaches for satellite navigation techniques include real time kinematic (RTK) and precise point positioning (PPP) techniques that are commonly used in high accuracy agricultural, industrial, and timing applications. In a typical RTK system, a base station is installed in a fixed and known location. Once the base station is able to obtain a PVT solution from the satellite transmissions, it is able to transmit any differences between its known location and the PVT solution as a correction signal to a nearby mobile or roving unit. RTK systems are typically fairly expensive, require time to set-up the base station, and the base station and mobile unit need to stay within a close proximity to each other. In a typical PPP system, a network of fixed reference stations receive the satellite signals and generate correction information that is distributed to the navigation receiver using satellites or other terrestrial-based wireless technology, such as a cellular network. While less expensive than RTK systems, a navigation receiver in a PPP system generally takes up to 30 minutes to converge on a high precision PVT solution and provides poor coverage at high latitudes or in challenging environments such as cities, steep terrain, and heavily wooded areas.

Improved techniques are desired.

SUMMARY

It has been discovered that position, velocity, and/or timing (PVT) solutions may be provided with levels of precision that have previously and conventionally been associated with RTK and PPP systems without many of the drawbacks. Using the augmentation techniques described herein, high-precision PVT solutions may be provided without resort to a generally proximate, terrestrial ground station having a fixed and precisely known position or an array of fixed reference stations. Instead, techniques described herein utilize a plurality of navigation receivers to share information about their own navigation observables and PVT solutions. The shared information is then used to develop augmented navigation models that the navigation receivers may then use to develop higher precision and more accurate PVT solutions.

Using the developed techniques, a GNSS augmentation approach uses a series of navigation receivers to track one or more combinations of MEO satellites, geostationary satellites, geosynchronous satellites, terrestrial beacons, low earth orbit (LEO) satellites, and/or the like, such as combinations of the GPS satellites, and LEO satellites, such as the Iridium satellites. Using the tracking information from both the navigation beacons and/or satellites, the augmentation approach generates modeling and other correction (augmentation) information that may then be distributed back to the navigation receivers. The navigation receivers may then use the augmentation information to correct their own observation of the navigation beacons and/or satellites to arrive at a higher-precision PVT solution with faster initial convergence times.

In some embodiments, a method includes receiving at one or more receivers first signals transmitted by one or more satellites, determining by the receivers first navigation observables based on the received first signals, receiving at a processing center information associated with the first navigation observables, determining by the processing center an ionosphere model based on at least the received information associated with the first navigation observables, transmitting the ionosphere model to the receivers, receiving by the receivers the ionosphere model, receiving by the receivers second signals transmitted by the one or more satellites, determining by the receivers second navigation observables based on the received second signals, and determining by the receivers a navigation solution based on the received ionosphere model and the second navigation observables.

In some embodiments, a method includes receiving at one or more navigation receivers first signals transmitted by one or more navigation beacons, determining by the navigation receivers first navigation observables based on the received first signals, receiving at an augmentation server information associated with the first navigation observables, determining by the augmentation server augmentation information based on at least the received information associated with the first navigation observables and computational models, transmitting the augmentation information to the navigation receivers, receiving by the navigation receivers the augmentation information, receiving by the navigation receivers second signals transmitted by the one or more navigation beacon, determining by the navigation receivers second navigation observables based on the received second signals and determining by the navigation receivers a respective high-precision position, velocity, and time (PVT) solution based on the received augmentation information and the second navigation observables.

In some examples, the first signals and the second signals are same signals. In some examples, the augmentation information is transmitted to the navigation receivers using a satellite. In some examples, the augmentation information is transmitted to the navigation receivers wirelessly using a wireless hot spot or a cellular tower. In some examples, each of the navigation beacons are selected from a group consisting of a MEO satellite, a LEO satellite, a geosynchronous satellite, a geostationary satellite, a HEO satellite, an airborne beacon, a terrestrial beacon, and a submerged beacon.

In some examples, the augmentation information is limited in scope based on a geographic location of a respective navigation receiver. In some examples, the augmentation information is limited in scope based on a last segment in a distribution system between the augmentation server and a respective navigation receiver. In some examples, the augmentation information is limited in scope based on temporal information associated with a respective navigation receiver.

In some examples, the high-precision PVT solution determines the location of a corresponding navigation receiver to within 10 cm, 95% of the time. In some examples, the computation models include a tomographic model for ionospheric effects. In some examples, a respective navigation receiver determines an initial high-precision PVT solution in less than 10 minutes after receiving the second signals.

In some examples, the information associated with the first navigation observables includes one or more items selected from a group consisting of pseudoranges, carrier Doppler shifts, carrier phase measurements, carrier to noise ratios, signal power levels, raw signal samples, digitized signal samples, lists of observable navigation beacons, PVT solutions, estimates of error for the PVT solutions, cellular localization information, wifi localization information, differential position errors between the PVT solutions and the cellular localization information, differential position errors between the PVT solutions and the wifi localization information, decoded data included in the first signals, navigation receiver clock information, temperatures, barometric pressures, humidities, compass headings, altitudes, navigation beacon clock information, navigation beacon position information, and navigation beacon parameters.

In some examples, determining the augmentation information comprises using one or more estimators. In some examples, determining the information associated with the first navigation observables is transmitted to the augmentation server using unused bandwidth at frequencies associated with the first signals.

In some embodiments, a GNSS augmentation system includes an augmentation server coupled to a plurality of navigation receivers. The augmentation server is configured to receive information associated with first navigation observables based on signals received by the navigation receivers from one or more navigation beacons, determine augmentation information based on at least the received information associated with the first navigation observables and computational models, and distribute the augmentation information to the navigation receivers using a distribution network, the distributed augmentation information being usable by the navigation receivers to determine a respective high-precision position, velocity, and time (PVT) solution based on the received augmentation information and second navigation observables associated with the receiver.

BRIEF DESCRIPTION OF THE DRAWINGS

FIG. 2 is a simplified diagram of perturbation effects and corresponding models that may be used by the augmentation server of FIG. 1 according to some embodiments.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, antennas, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, global navigation satellite systems, satellites, network control, and other such functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment. The invention may be implemented using any combination of hardware and software as may be appropriate given the particular circumstances.

The present invention may be better understood, and its numerous objects, features, and advantages made apparent to those skilled in the art by referencing the accompanying drawings. Further details are provided in Appendix A, which forms an integral portion of the present disclosure.

Figure 1:
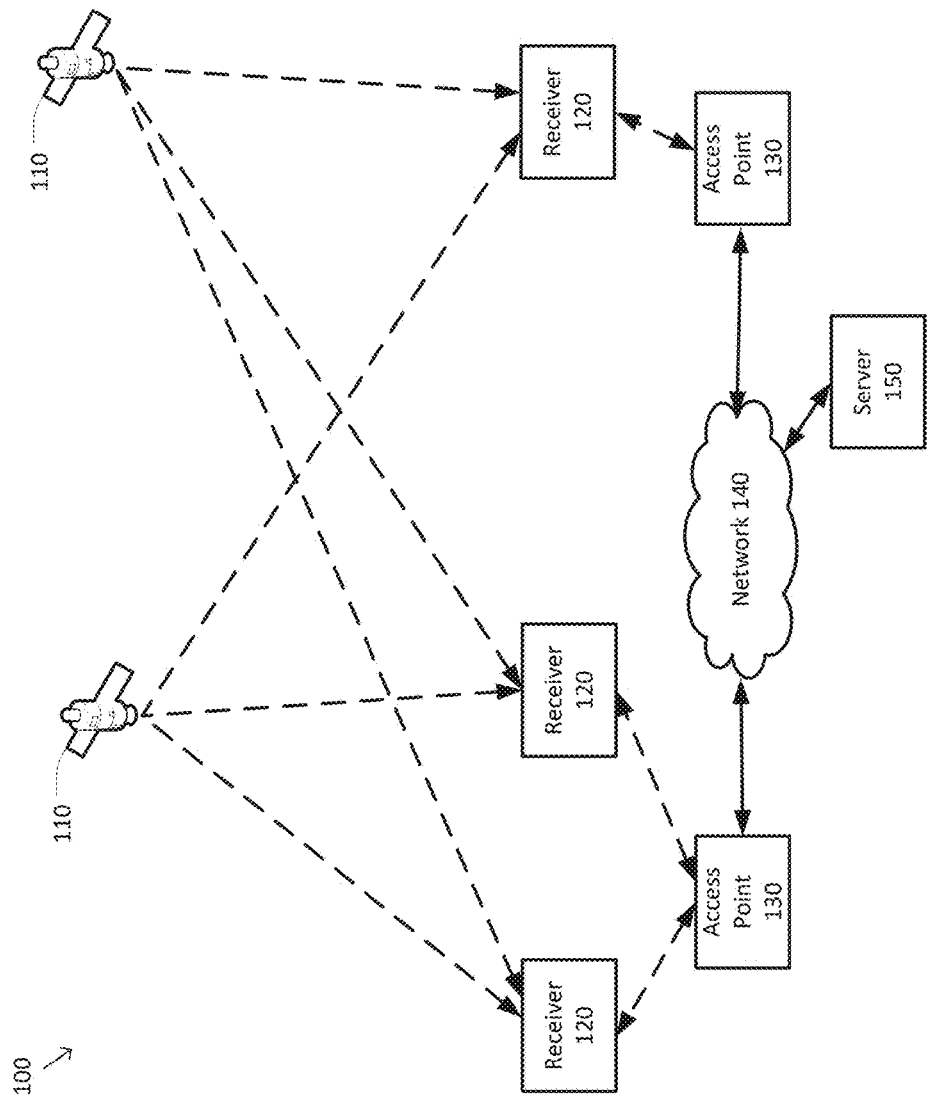
FIG. 1 is a simplified diagram of an augmented radio navigation system according to some embodiments.

FIG. 1 is a simplified diagram of an augmented radio navigation system 100 according to some embodiments. As shown in FIG. 1, augmented radio navigation system 100 includes one or more navigation beacons 110. In some embodiments, the navigation beacons 110 may include MEO satellites, LEO satellites, geostationary satellites, geosynchronous satellites, high earth orbit (HEO) satellites, airborne beacons, terrestrial beacons, submerged beacons, and/or the like. In some examples, the MEO satellites may be GNSS and/or GPS satellites and/or the LEO satellites 120 may be Iridium satellites. Each of the navigation beacons 110 may transmit one or more signals that may become navigation observables, when they are received by one or more navigation receivers 120. Depending upon the locations of the navigation beacons 110 and the navigation receivers 120, each of the navigation receivers 120 may observe navigation observables from different combinations of the navigation beacons 110. In some embodiments, the navigation receivers 120 may be distributed throughout an area for which augmentation services are desired.

In addition to including one or more radio receivers for receiving signals from the navigation beacons 110, each of the navigation receivers 120 may further include one or more processors for controlling operation and/or execution of hardware and/or software on the respective navigation receiver 120 and/or processing of the received signals, determine navigation observables, determine PVT solutions, and/or the like. In some examples, each of the one or more processors may be a CPU, a multi-core processor, a field programmable gate array (FPGA), an application specific integrated circuit (ASIC), a virtual processor, and/or the like. The memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Mobile navigation receivers have traditionally played a passive role in navigation systems. Typical stand-alone devices receive navigation observables from navigation beacons, such as navigation beacons 110, and determine a PVT solution from the navigation observables. For example, when the navigation beacons 110 include GPS satellites, a stand-alone GPS receiver may typically achieve positional accuracy to within about 10 meters. More sophisticated navigation receivers may also receive augmentation information, such as from one or more base stations, with the augmentation information being used to achieve higher positional accuracy. In each of these cases, the navigation receivers play a passive role in the generation of the augmentation information and participate at most in the generation of their own PVT solutions.

In contrast, the navigation receivers 120 are each further equipped with a two-way communication system that allows each of the navigation receivers 120 to both send and receive augmentation-related information through one or more access points 130. In some examples, each of the navigation receivers 120 may be associated with or be part of a mobile phone and/or mobile smart phone device. In some examples, each of the one or more access points 130 may provide two-way communication to a respective subset of the navigation receivers 120 using one or more technologies including wireless access points, cellular communication, cellular data networks (e.g., 1X, 3G, 4G, 4GLTE, and/or the like), wireless mesh networks, satellite communication links, and/or the like. In some embodiments, the navigation receivers 120 may use empty bandwidth at frequencies associated with the signals from the navigation beacons 110 to send and/or receive the augmentation-related information. In some examples, the empty bandwidth may be associated with code spreading, unused time division multiplexing (TDMA) slots, and/or the like. Using the access points 130, the navigation receivers 120 may communicate through a network 140 to one or more augmentation servers, such as a representative augmentation server 150.

Each of the navigation receivers 120 may share information about the received navigation observables with augmentation server 150 using the access points 130 and network 140. In some examples, the shared information may include information associated with the navigation observables such as one or more pseudoranges, carrier Doppler shifts, carrier phase measurements, carrier to noise ratios, signal power levels, raw and/or digitized signal samples, lists of observable navigation beacons 110, and/or the like. In some examples, the shared information may further include information derived from the navigation observables such as one or more PVT solutions, estimates of error for the PVT solutions, cellular and/or wifi localization and position information, differential position errors between the PVT solutions and the cellular and/or wifi localization and position information, decoded data included in the signals received from the navigation beacons 110, and/or the like. In some examples, the shared information may further include receiver clock information, weather-related information such as one or more temperatures, barometric pressures, humidities, and/or like obtained from one or more sensors accessible to the navigation receivers 120, and/or additional navigation information associated with the navigation receivers 120 such as information from compasses, altimeters, inertial measurement units, and/or the like. In some examples, the shared information may further include navigation beacon clock information, navigation beacon position information, and/or additional parameters associated with the one or more navigation beacons 110.

In some embodiments, network 140 may include one or more networks including local area networks (LANs), such as Ethernets, and/or wide area networks (WANs), such as the internet. In some examples, one or more of the networks may be proprietary to prevent sharing of the augmentation information with recipients other than authorized users.

In some embodiments, the augmentation server 150 may be a standalone workstation, a cluster, a production server, within a virtual machine, a plurality of computer servers using distributed processing, and/or the like. In some examples, augmentation server 150 may be implemented using a cloud-based computing infrastructure. In some examples, augmentation server 150 may include one or more processors coupled to memory. In some examples, the one or more processors may control operation and/or execution of hardware and/or software on augmentation server 140. In some examples, each of the one or more processors may be a CPU, a multi-core processor, a FPGA, an ASIC, a virtual processor, and/or the like. The memory may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Using the shared information from the navigation receivers 120, the augmentation server 150 uses one or more models and/or estimators to develop augmentation information that may be used to account for various perturbations in the navigation observables that commonly perturb and/or affect radio signals transmitted over distances through the atmosphere and/or other transmission media.

FIG. 2 is a simplified diagram of perturbation effects and corresponding models that may be used by augmentation server 150 according to some embodiments. As shown in FIG. 2, the perturbations may include effects due to gravitation, solar activity, tides, relativity, tectonic motion, the ionosphere, and/or the troposphere. Each of these perturbations may be addressed using one or more known and/or improved models as noted in FIG. 2. Some embodiments may also include other sources of perturbations such as space vehicle thrust maneuvers, exogenous perturbing forces, ocean and atmospheric tides, tidal loading effects, multipath and/or signal reflection models, reference station and/or receiver antenna models, and/or the like. These, and the perturbations noted in FIG. 2, may be modeled, for example, via coefficients and/or known information, and/or may be estimated as part of the augmentation and/or correction information. In some embodiments, one or more perturbations may be ignored.

Referring back to FIG. 1, based on the modeling of the navigation observables as affected by the various perturbations of FIG. 2, the augmentation server 150 determines augmentation and/or correction information to account for errors in positions and/or clocks of the navigation beacons 110 as well as other atmospheric effects due to the troposphere and the ionosphere and also signal obstruction effects such as multipath and/or signal reflections. The determined augmentation information is sufficiently broad in geographic and/or temporal scope that it may account for expected errors and/or perturbations that are anticipated at each of the navigation receivers 120. More specifically, computational techniques that are described in greater detail in the various models and example algorithms included with Appendix A, may be used by augmentation server 150 to model and/or determine the augmentation information.

The augmentation information may be made available to the navigation receivers 120 to improve the positional accuracy and/or to improve convergence times of the PVT solutions being determined by the navigation receivers 120. In some examples, the augmentation information may be returned to the navigation receivers 120 using network 140 and the access points 130. In some examples, augmentation server 150 may forward the augmentation information to an uplink station for the navigation beacons 110 so that the augmentation information may be distributed by the navigation beacons 110. In some examples, the augmentation information may be transmitted as data embedded in the signals transmitted by the navigation beacons 110.

In some embodiments, the augmentation information distributed by augmentation server 150 to the navigation receivers 120 may be less than all of the augmentation information available to augmentation server 150. Full worldwide augmentation information may be several megabytes or larger in size and may be sufficiently dynamic to require regular updates. Thus, it may not be practical and/or possible to distribute this much augmentation information throughout the augmented radio navigation system 100.

In some embodiments, augmentation server 150 may reduce the amount of augmentation information distributed to each of the navigation receivers 120 based on geographic information associated with the respective navigation receiver 120, a respective access point 130, and/or a respective navigation beacon 110. In some examples, when a particular portion of the distribution system is only capable of reaching navigation receivers 120 in a limited geographic area, the augmentation information may be limited to the augmentation information associated with that limited geographic area. For example, the limited geographic area may be defined by a transmission range for a wireless hot spot/network, a cellular tower/network, a satellite spot beam, and/or the like. In some examples, this may include distributing satellite clock and/or orbit correction information associated with only the satellites from which observables may be received at the respective navigation receiver 120. For example, a navigation receiver 120 located in North America does not generally have to receive augmentation information associated with a satellite currently over Australia. In some examples, this may include distributing ionospheric, tropospheric, and/or multipath correction information associated with the limited geographic area. For example, a navigation receiver 120 located in North America does not generally have to receive augmentation information associated with the ionosphere, atmosphere, and/or multipath environment in Australia.

In some embodiments, augmentation server 150 may reduce the amount of augmentation information distributed to each of the navigation receivers 120 based on temporal information associated with each respective navigation receiver 120, each respective access point 130, and/or each respective navigation beacon 110. In some examples, one or more users of each respective navigation receiver 120 may desire to limit reception of the augmentation information only during periods when the navigation receiver 120 is active, during periods of subscription, and/or the like. In some examples, when no navigation receivers 120 are within a limited geographic area associated with an access point 130 and/or a navigation beacon 110, it may be possible to temporarily suspend distribution of the augmentation information in that limited geographic area.

In some embodiments, augmentation server 150 may also distribute augmentation information that varies in geometric scope, temporal scope, resolution, and/or the like from already modeled augmentation information. In some examples, augmentation server 150 may use one or more estimators and/or or one or more numerical interpolation and/or extrapolation methods to generate the augmentation information for distribution.

In some embodiments, the augmented information may include modeling information that each of the navigation receivers 120 may use to determine a high-precision PVT solution for the respective navigation receiver 120. In some examples, the modeling information may include modeling data for ionospheric effects, tropospheric effects, corrected ephemerides for the navigation beacons 110, clock drift and/or frequency errors in the navigation beacons 110, modeling data for multipath effects and/or signal reflections, modeling data for specific receiver antenna types, and/or the like.

In some embodiments, each of the navigation receivers 120 may be an augmented and/or enhanced version of a conventional GNSS or GPS receiver. In some examples, each of the navigation receivers 120 may be enhanced to receive the augmentation information from augmentation server 150 and use the augmentation information to correct the navigation and/or LEO observables to obtain a high-precision PVT solution for the respective navigation receiver 120. In some examples, the use of the augmentation information may allow each of the navigation receivers 120 to converge on the high-precision PVT solution in ten minutes or less. In some examples, the convergence may occur in two minutes or less.

In some embodiments, each of the navigation receivers 120 may be associated with a respective mobile phone or other portable device. A custom application may be made available to the portable device that may be used to receive the augmentation information from augmentation server 150 and to use the received augmentation information to improve the accuracy and/or precision of the PVT solutions computed for the mobile device.

As discussed above and further emphasized here, FIG. 1 is merely an example which should not unduly limit the scope of the claims. One of ordinary skill in the art would recognize many variations, alternatives, and modifications. In some embodiments, augmentation server 150 may be optional. In some examples, the navigation receivers 120 may communicate among themselves and/or use the access points 130 and network 140 to share the navigation information among themselves, with each of the navigation receivers 120 determining its own augmentation information based on the shared navigation information it receives. In some embodiments, the augmentation information may be shared with navigation receivers that do not support two-way communication and/or do not share information with augmentation server 150.

Figure 3:
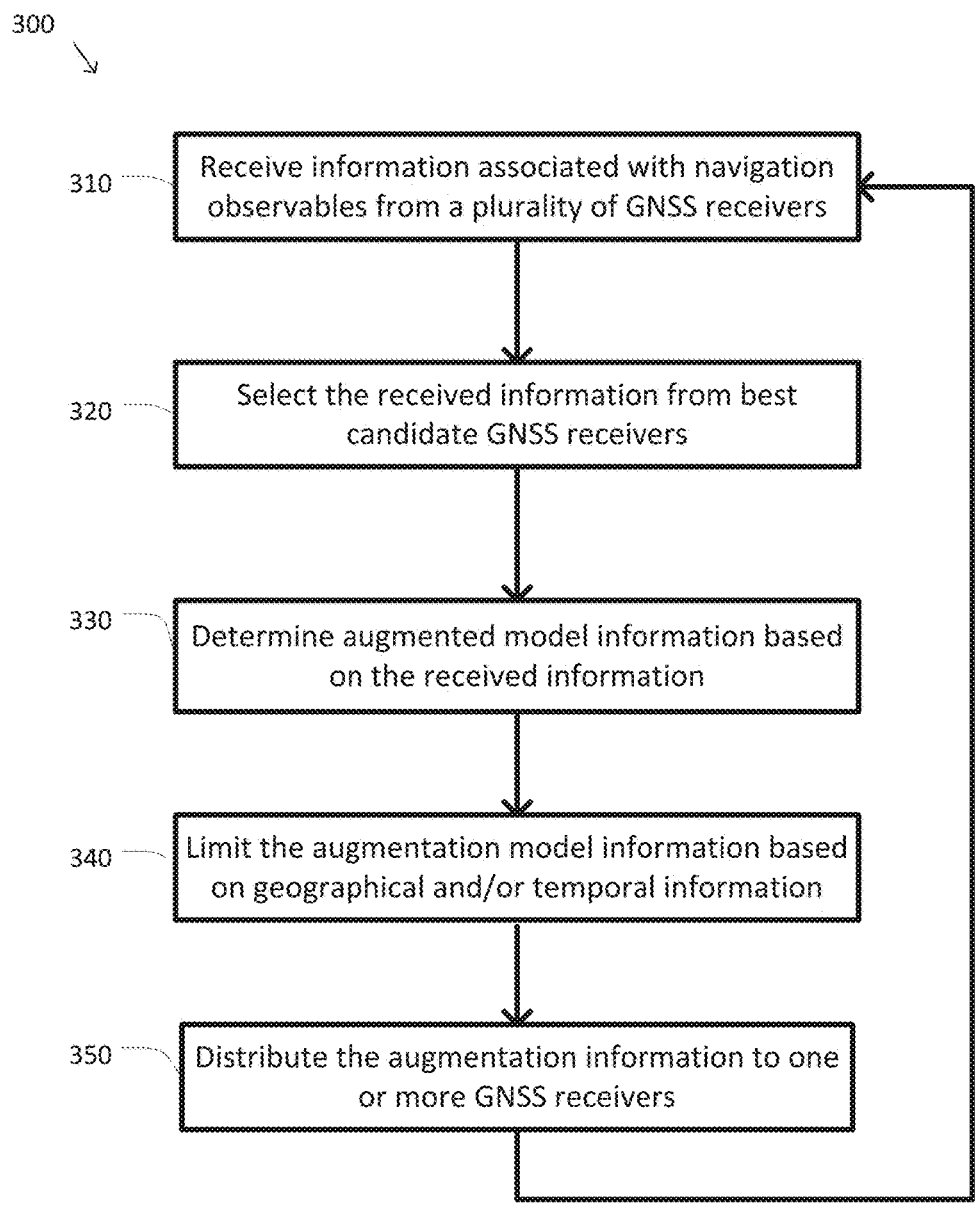
FIG. 3 is a simplified diagram of a method of providing GNSS augmentation information according to some embodiments.

FIG. 3 is a simplified diagram of a method 300 of providing GNSS augmentation information according to some embodiments. In some embodiments, one or more of the processes 310-350 of method 300 may be implemented, at least in part, in the form of executable code stored on non-transient, tangible, machine readable media that when run by one or more processors (e.g., the one or more processors associated with navigation receivers 120 and/or augmentation server 150) may cause the one or more processors to perform one or more of the processes 310-350.

At a process 310, information associated with navigation observables is received from a plurality of navigation receivers. In some examples, the information may be received at an augmentation server, such as augmentation server 150. One or more navigation receivers, in an augmented radio navigation system receive signals transmitted by one or more navigation beacons and generate observables and/or other navigation-related information associated with the received signals. In some embodiments, the navigation receivers may be the navigation receivers 120. In some embodiments, the augmented radio navigation system may be the augmented radio navigation system 100. In some embodiments, the navigation beacons may be the navigation beacons 110. In some examples, the received information from the navigation receivers may include information associated with the navigation observables such as one or more pseudoranges, carrier Doppler shifts, carrier phase measurements, carrier to noise ratios, signal power levels, raw and/or digitized signal samples, lists of observable navigation beacons, and/or the like from one or more of the navigation receivers. In some examples, the received information may further include information derived from the navigation observables such as one or more PVT solutions, estimates of error for the PVT solutions, cellular and/or wifi localization and position information, differential position errors between the PVT solutions and the cellular and/or wifi localization and position information, decoded data included in the signals received from the navigation beacons, and/or the like from one or more of the navigation receivers. In some examples, the received information may further include receiver clock information, weather-related information such as one or more temperatures, barometric pressures, humidities, and/or like obtained from one or more sensors accessible to the navigation receivers 120, and/or additional navigation information associated with the navigation receivers 120 such as information from compasses, altimeters, inertial measurement units, and/or the like. In some examples, the shared information may further include navigation beacon clock information, navigation beacon position information, and/or additional parameters associated with the one or more navigation beacons.

At an optional process 320, the received information is selected from the best candidate navigation receivers. The quality of the PVT solution determined by each of the navigation receivers may differ significantly. In some embodiments, the PVT solution quality may depend on the number of navigation beacons accessible to a navigation receiver, signal power levels, carrier to noise ratios, multipath issues, signal reflection issues, and/or the like. In some embodiments, the PVT solution may be considered to have lesser reliability based on error estimates of the PVT solution provided by the navigation receiver. In some embodiments, the PVT solution received from a navigation receiver may be considered of lower quality due to known terrain associated with the received PVT solution. In some examples, PVT solutions located within buildings, tunnels, and/or other structures may be considered to have lesser reliability. In some examples, PVT solutions with altitudes above or below known ground level may be considered to have lesser reliability. In some examples, PVT solutions associated with pedestrian-based navigation receivers may be considered to have lesser reliability when they are located in the middle of highways, bodies of water, and/or the like. Based on one or more determinations of PVT solution quality and/or reliability, the augmentation server may select the received information from the higher quality and/or higher reliability navigation receivers, and may otherwise ignore information from the other navigation receivers.

At a process 330, augmented model information is determined based on the received information. The information associated with the navigation observables received during process 310 and/or the information selected during process 320 is used to determine augmented model information. In some examples, the various models may include one or more of the models in FIG. 2 to account for various perturbations that may affect the navigation observables received by the navigation receivers. Some embodiments may also include other sources of perturbations, such as space vehicle thrust maneuvers, exogenous perturbing forces, ocean and/or atmospheric tides, tidal loading effects, multipath and/or signal reflection models, reference station and/or receiver antenna models, and/or the like. These, and the perturbations noted in FIG. 2, may be modeled, for example, via coefficients and/or known information, and/or may be estimated as part of the augmentation and/or correction information. In some embodiments, one or more perturbations may be ignored. In some embodiments, the augmented information may include modeling information that a receiver, such as any of the navigation receivers 120, may use to determine a high-precision PVT solution for the navigation receiver. In some examples, the modeling information may include modeling data for ionospheric effects, tropospheric effects, corrected ephemerides for navigation beacons that are satellites, clock drift and/or frequency errors in the navigation beacons, modeling data for multipath effects and/or signal reflections, modeling data for specific receiver antenna types, and/or the like. In some embodiments, depending on the desired scope and/or resolution of the augmentation information, determination of the augmentation information may include using one or more estimators such as a least-squares estimator and/or one or more numerical methods for interpolation and/or extrapolation.

At an optional process 340, the augmentation information may be limited based on geographic and/or temporal information. To limit the amount of augmentation information that may be distributed to receivers, the augmentation information may be limited in scope based on geographic and/or temporal information associated with the receivers.

In some embodiments, the amount of augmentation information distributed to the navigation receivers may be limited based on geographic information associated with the respective navigation receivers and/or the last segment in a distribution system used to provide the augmentation information to the navigation receivers. In some examples, when the last segment in the distribution system is only capable of reaching navigation receivers in a limited geographic area, the augmentation information may be limited to the augmentation information associated with that limited geographic area. For example, the limited geographic area may be defined by a transmission range for a wireless hot spot/network, a cellular tower/network, a satellite spot beam, and/or the like. In some examples, this may include distributing navigation beacon clock and/or orbit correction information associated with only the navigation beacons from which observables may be received at navigation receivers in the limited geographic area. In some examples, this may include distributing ionospheric, tropospheric, and/or multipath correction information associated with the limited geographic area.

In some embodiments, the amount of augmentation information distributed to the navigation receivers may be limited based on temporal information associated with navigation receivers and/or the last segment in the distribution system. In some examples, one or more users of the respective navigation receivers may desire to limit reception of the augmentation information only during periods when the respective navigation receivers are active, during periods of subscription, and/or the like. In some examples, when there are no navigation receivers within a limited geographic area associated with a last segment in the distribution system, it may be possible to temporarily suspend distribution of the augmentation information in that limited geographic area.

At a process 350, the augmentation information may be distributed to one or more navigation receivers. The augmentation information determined during process 330 and/or optionally limited during process 340 is distributed to one or more navigation receivers so that the navigation receivers may use the augmentation information to develop a high-precision PVT solution based on the navigation observables detected by the respective navigation receivers. In some embodiments, the augmentation information may be distributed using a distribution system including one or more networks, LANs, WANs, access points, and/or the like. In some examples, one or more of the networks may be proprietary to prevent sharing of the augmentation information with recipients other than authorized users. In some examples, at least the last segment of the one or more networks in the distribution system is wireless in nature so that the navigation receivers are not tethered via a cable to the distribution system. In some examples, the last segment may be implemented using any wireless technology including wireless hot spots, cellular networks, satellite transmissions, and/or the like. In some examples, the distribution system may forward the augmentation information to an uplink station associated with one or more navigation beacons so that the augmentation information may be distributed by the navigation beacons. In some examples, the augmentation information may be transmitted as data embedded in the signals that form the navigation observables received by the navigation receivers.

Figure 4:
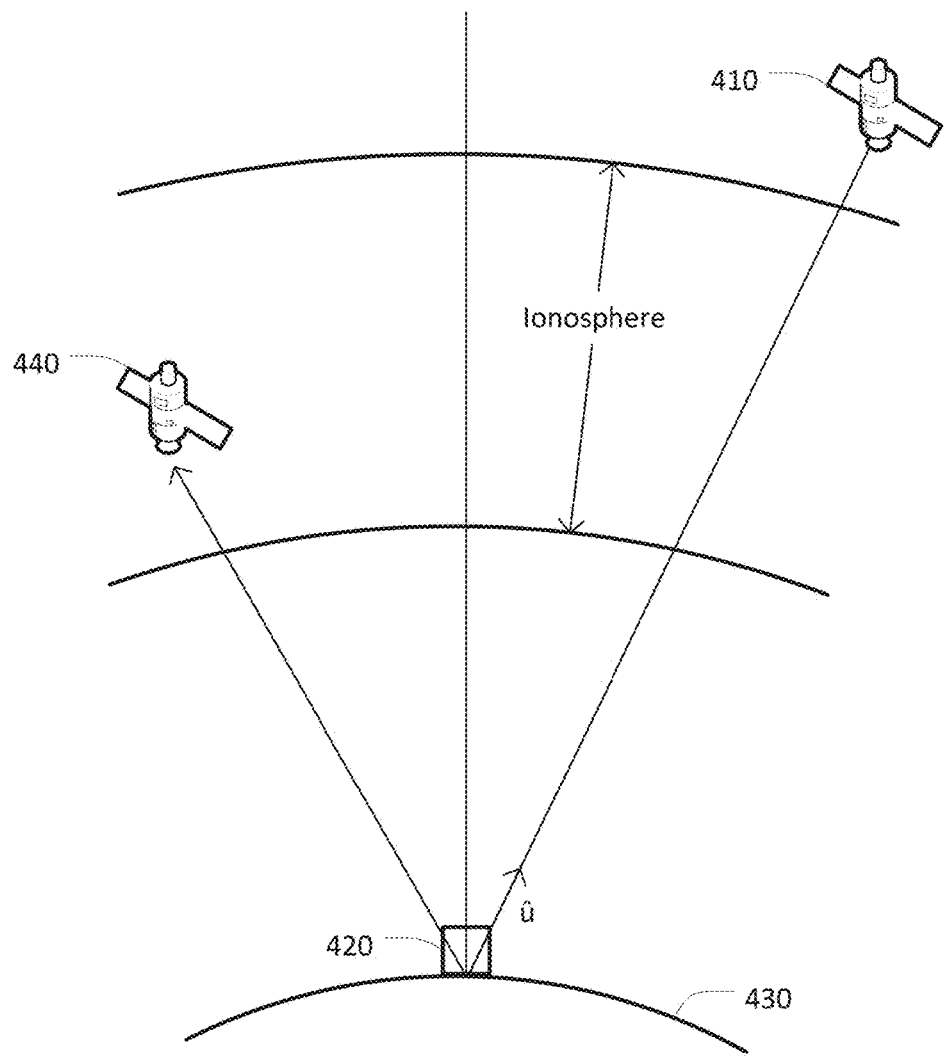
FIG. 4 is a simplified diagram of atmospheric modeling according to some embodiments.

FIG. 4 is a simplified diagram of atmospheric modeling according to some embodiments. As shown in FIG. 4, the effect that the ionosphere has on navigation observables depends on where the satellite is located relative to the ionosphere. The ionosphere extends from about 90 km to 1600 km above the surface of the earth and is composed of plasma containing free electrons and ions. This plasma affects electromagnetic waves in very predictable ways that should be accounted for in augmented radio navigation system 100. The speed of propagation of radio signals through the ionosphere depends on the number of free electrons in the path of the radio signal. During night time hours the number of free electrons in the ionosphere maintains a relatively low and stable value, but during the day solar radiation and/or solar flares significantly increase the level of free electrons in the ionosphere and thus the impact the ionosphere may have on the navigation observables.

Many models exist for determining the impact of the ionosphere on the navigation observables for satellites located above the ionosphere, such as a MEO satellite 410 as shown in FIG. 4. Some models are empirical in nature and others are based on first principles, such as those based on measurements made at two different nominal carrier frequencies broadcast from the same transmitter. In some systems, the effect of the ionosphere may be modeled using the Klobuchar Model. In a basic form, Klobuchar Model is based on a four-parameter zenith model of the effect the ionosphere has on a radio signal traveling vertically between a transmitter and receiver that are respectively above and below the ionosphere. The Klobuchar Model is shown in Equation 1.

$$\tilde{I} = \begin{cases} c\left[A_1 + A_2\cos\left(\frac{2\pi(t-A_3)}{A_4}\right)\right], & |t-A_3| < \frac{A_4}{4} \\ cA_1 & \text{otherwise} \end{cases} \quad (1)$$

The four parameters, $A_1$-$A_4$, which vary by the frequency of the signal being transmitted by satellite 410, may be provided to the receivers, such as a navigation receiver 420 located on the surface of the earth 430, as part of the augmentation information distributed by an augmentation server. In some embodiments, more complex versions of the Klobuchar model may also be used. For example, data embedded in GPS signals includes the parameters for an 8-parameter Klobuchar model similar to Equation 1, but modeling some of the $A_1$-$A_4$ parameters using multi-coefficient polynomial expansions. In some embodiments, the effect of the ionosphere from Equation 1 may also be adjusted to account for the increased distance the received signal travels through the ionosphere when, for example, the transmitter is not located directly above the receiver 420 as is the case for satellite 410. This adjustment may be determined by knowing the line of sight unit vector û, determined using the positions of satellite 410 and navigation receiver 420. In some examples, the position of satellite 410 may be included in or may derivable from the augmentation information and the position of navigation receiver 420 may be estimated from a recent PVT solution for receiver 420. In some embodiments, Ĩ may be multiplied by the obliquity factor OF of Equation 2 to make this adjustment, where ζ is the angle of the satellite from the zenith and is derivable from the line of sight unit vector û, $R_E$ is the average radius of the earth, and $h_I$ is the mean ionospheric height, which typically ranges from 300 to 400 km.

$$OF = \sqrt{1 - \left(\frac{R_E \sin\zeta}{R_E + h_I}\right)^2} \quad (2)$$

The Klobuchar Model of Equation 1, even when adjusted by the obliquity factor of Equation 2, does not provide a very complete model of the effects of the ionosphere on the satellite observables when, as in the case of a LEO satellite 440, the LEO satellite 440 is located within the ionosphere. The Klobuchar Model of Equation 1 and other ionosphere models, typically model the total electron count (TEC) and/or a similar quantity for the entire ionosphere as if the ionosphere were a thin shell between the satellite, such as satellite 410, and the navigation receiver 420. As the location of the LEO satellite 440 demonstrates, the ionosphere is not a thin shell and a more complex ionospheric model, such as a tomographic model should be used that accounts for the location of satellite 440 within the ionosphere. In some examples, this tomographic model uses a non-uniform model of the ionosphere to account for free electron densities that vary depending on the location and altitude within the ionosphere. Distribution of the tomographic model of the ionosphere with the augmentation information would permit navigation receiver 420 to remove the effects due to the portion of the ionosphere located above satellite 440 when processing and analyzing observables from satellite 440. In some examples, this would improve the accuracy and precision of the PVT solution determined for receiver 440.

The augmented radio navigation system 100 and method 300 may be utilized to more accurately model the $A_1$-$A_4$ and other parameters of the Klobuchar Model and/or develop the tomographic model. For example, expected pseudoranges for each of the navigation receivers (e.g., as determined based on the received PVT solutions, topographic models, and navigation beacon position models) may be paired with observed pseudoranges received from the same navigation receiver. An estimator, such as a least squares estimator, may then be used to determine values for the Klobuchar and/or tomographic model parameters that describe a best fit model for the perturbations caused by the ionosphere on the observed pseudoranges. The best fit model for the ionosphere may then be distributed to the navigation receivers as part of the augmentation information. In some examples, models with more parameters and/or greater complexity may be similarly estimated using similar techniques.

Some embodiments of the navigation receivers 120 and/or augmentation server 150 may include non-transient, tangible, machine readable media that include executable code that when run by one or more processors may cause the one or more processors to perform the processes of method 300 as described above. Some common forms of machine readable media that may include the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
    determining first navigation observables by a navigation device from signals of one or more navigation beacons, the first navigation observables including information for determining a position, velocity and time (PVT) solution;
    submitting the first navigation observables from the navigation device to a navigation server;
    receiving crowd-sourced augmentation information by the navigation device from the navigation server in response, the augmentation information including corrections for perturbations in the first navigation observables that may reduce precision of the PVT solution, the crowd-sourced augmentation information being generated by the navigation server based on PVT solutions submitted by a plurality of navigation devices; and determining, by the navigation device, the PVT solution using second navigation observables and the augmentation information, including correcting the perturbations in the second navigation observables according to the augmentation information.

2. The method of claim 1, wherein the first and second navigation observables include at least one of a pseudorange, a carrier Doppler shift, a carrier phase measurement, a carrier to noise ratio, a signal power level, a signal sample, or a list of navigation beacons.

3. The method of claim 1, wherein the augmentation information includes an ionosphere model usable for correcting ionosphere interference with the signals.

4. The method of claim 1, comprising presenting at least a portion of the PVT solution to a user of the navigation device.

5. The method of claim 1, wherein the navigation beacons comprise at least one of a middleEarth orbit (MEO) satellite, a lowEarth orbit (LEO) satellite, a geostationary satellite, a geosynchronous satellite, a terrestrial beacon, an airborne beacon, or a submerged beacon.

6. A method comprising:
receiving navigation observables by a navigation server from a plurality of navigation devices, the navigation observables including information derived from signals of navigation beacons and for determining position, velocity and time (PVT) solutions;
determining, by the navigation server, a respective quality value of navigation observables from each navigation device based on a respective terrain associated with each respective PVT solution for each respective navigation device;
selecting one or more navigation observables of a navigation device from the received navigation observables of the plurality of navigation devices based on the quality values of the PVT solutions;
determining augmentation information using the selected one or more navigation observables, the augmentation information including corrections for perturbations in the navigation observables that may reduce precision of the PVT solutions; and
providing the augmentation information from the navigation server to one or more navigation devices.

7. The method of claim 6, wherein the navigation observables include at least one of a pseudorange, a carrier Doppler shift, a carrier phase measurement, a carrier to noise ratio, a signal power level, a signal sample, or a list of navigation beacons.

8. The method of claim 6, wherein selecting the one or more navigation observables comprises selecting the one or more navigation observables based on at least one of:
a number of navigation beacons associated with the navigation observables,
a respective error estimate provided by each navigation device,
a respective terrain associated with each PVT solution, or
a respective elevation associated with each PVT solution.

9. The method of claim 6, wherein the augmentation information comprises an ionosphere model usable for correcting ionosphere interference with the signals.

10. The method of claim 6, wherein determining the augmentation information comprises determining the perturbation caused by at least one of gravity of the Earth, solar pressure, tides, atmospheric drag, relativistic effects, crustal and tectonic motion, ionosphere interference or troposphere interference.

11. The method of claim 6, comprising limiting the augmentation information based on geographic or temporal information.

12. A system comprising:
one or more processors; and
at least one non-transitory computer-readable medium storing instructions operable to cause the one or more processors to perform operations comprising:
determining first navigation observables by a navigation device from signals of one or more navigation beacons, the first navigation observables including information for determining a position, velocity and time (PVT) solution;
submitting the first navigation observables from the navigation device to a navigation server;
receiving crowd-sourced augmentation information by the navigation device from the navigation server in response, the augmentation information including corrections for perturbations in the first navigation observables that may reduce precision of the PVT solution, the crowd-sourced augmentation information being generated by the navigation server based on PVT solutions submitted by a plurality of navigation devices; and
determining, by the one or more processors, the PVT solution using second navigation observables and the augmentation information, including correcting the perturbations in the second navigation observables according to the augmentation information.

13. The system of claim 12, wherein the first and second navigation observables include at least one of a pseudorange, a carrier Doppler shift, a carrier phase measurement, a carrier to noise ratio, a signal power level, a signal sample, or a list of navigation beacons.

14. The system of claim 12, wherein the augmentation information includes an ionosphere model usable for correcting ionosphere interference with the signals.

15. The system of claim 12, the operations comprising presenting at least a portion of the PVT solution to a user of the navigation device.

16. The system of claim 12, wherein the navigation beacons comprise at least one of a middleEarth orbit (MEO) satellite, a lowEarth orbit (LEO) satellite, a geostationary satellite, a geosynchronous satellite, a terrestrial beacon, an airborne beacon, or a submerged beacon.

17. A system comprising:
one or more processors; and
at least one non-transitory computer-readable medium storing instructions operable to cause the one or more processors to perform operations comprising:
receiving navigation observables by a navigation server from a plurality of navigation devices, the navigation observables including information derived from signals of navigation beacons and for determining position, velocity and time (PVT) solutions;
determining, by the navigation server, a respective quality value of navigation observables from each navigation device based on a respective terrain associated with each respective PVT solution for each respective navigation device;
selecting one or more navigation observables of a navigation device from the received navigation observables of the plurality of navigation devices based on the quality values of the PVT solutions;
determining augmentation information using the selected one or more navigation observables, the augmentation information including corrections for perturbations in the navigation observables that may reduce precision of the PVT solutions; and providing the augmentation information from the navigation server to one or more navigation devices.

18. The system of claim 17, wherein the navigation observables include at least one of a pseudorange, a carrier Doppler shift, a carrier phase measurement, a carrier to noise ratio, a signal power level, a signal sample, or a list of navigation beacons.

19. The system of claim 17, wherein selecting the one or more navigation observables comprises selecting the one or more navigation observables based on at least one of:
- a number of navigation beacons associated with the navigation observables,
- a respective error estimate provided by each navigation device,
- a respective terrain associated with each PVT solution, or
- a respective elevation associated with each PVT solution.

20. The system of claim 17, wherein the augmentation information comprises an ionosphere model usable for correcting ionosphere interference with the signals.

21. The system of claim 17, wherein determining the augmentation information comprises determining the perturbation caused by at least one of gravity of the Earth, solar pressure, tides, atmospheric drag, relativistic effects, crustal and tectonic motion, ionosphere interference or troposphere interference.

22. The system of claim 17, the operations comprising limiting the augmentation information based on geographic or temporal information.

23. At least one non-transitory computer-readable medium storing instructions operable to cause one or more processors to perform operations comprising:
- determining first navigation observables by a navigation device from signals of one or more navigation beacons, the first navigation observables including information for determining a position, velocity and time (PVT) solution;
- submitting the first navigation observables from the navigation device to a navigation server;
- receiving crowd-sourced augmentation information by the navigation device from the navigation server in response, the augmentation information including corrections for perturbations in the first navigation observables that may reduce precision of the PVT solution, the crowd-sourced augmentation information being generated by the navigation server based on PVT solutions submitted by a plurality of navigation devices; and
- determining, by one or more processors, the PVT solution using second navigation observables and the augmentation information, including correcting the perturbations in the second navigation observables according to the augmentation information.

24. The non-transitory computer-readable medium of claim 23, wherein the first and second navigation observables include at least one of a pseudorange, a carrier Doppler shift, a carrier phase measurement, a carrier to noise ratio, a signal power level, a signal sample, or a list of navigation beacons.

25. The non-transitory computer-readable medium of claim 23, wherein the augmentation information includes an ionosphere model usable for correcting ionosphere interference with the signals.

26. The non-transitory computer-readable medium of claim 23, the operations comprising presenting at least a portion of the PVT solution to a user of the navigation device.

27. The non-transitory computer-readable medium of claim 23, wherein the navigation beacons comprise at least one of a middleEarth orbit (MEO) satellite, a lowEarth orbit (LEO) satellite, a geostationary satellite, a geosynchronous satellite, a terrestrial beacon, an airborne beacon, or a submerged beacon.

28. At least one non-transitory computer-readable medium storing instructions operable to cause one or more processors to perform operations comprising:
- receiving navigation observables by a navigation server from a plurality of navigation devices, the navigation observables including information derived from signals of navigation beacons and for determining position, velocity and time (PVT) solutions;
- determining, by the navigation server, a respective quality value of navigation observables from each navigation device based on a respective terrain associated with each respective PVT solution for each respective navigation device;
- selecting one or more navigation observables of a navigation device from the received navigation observables of the plurality of navigation devices based the respective quality values of the PVT solutions;
- determining augmentation information using the selected one or more navigation observables, the augmentation information including corrections for perturbations in the navigation observables that may reduce precision of the PVT solutions; and
- providing the augmentation information from the navigation server to one or more navigation devices.

29. The non-transitory computer-readable medium of claim 28, wherein the navigation observables include at least one of a pseudorange, a carrier Doppler shift, a carrier phase measurement, a carrier to noise ratio, a signal power level, a signal sample, or a list of navigation beacons.

30. The non-transitory computer-readable medium of claim 28, wherein selecting the one or more navigation observables comprises selecting the one or more navigation observables based on at least one of:
- a number of navigation beacons associated with the navigation observables,
- a respective error estimate provided by each navigation device,
- a respective terrain associated with each PVT solution, or
- a respective elevation associated with each PVT solution.

31. The non-transitory computer-readable medium of claim 28, wherein the augmentation information comprises an ionosphere model usable for correcting ionosphere interference with the signals.

32. The non-transitory computer-readable medium of claim 28, wherein determining the augmentation information comprises determining the perturbation caused by at least one of gravity of the Earth, solar pressure, tides, atmospheric drag, relativistic effects, crustal and tectonic motion, ionosphere interference or troposphere interference.

33. The non-transitory computer-readable medium of claim 28, the operations comprising limiting the augmentation information based on geographic or temporal information.

* * * * *